METHOD OF ELECTROCHEMICALLY MACHINING A WORKPIECE INCREMENTALLY USING A PLURALITY OF ELECTRODES DIMENSIONAL PROGRESSIVELY CLOSER TO THE DESIRED CONFIGURATION

Filed Dec. 17, 1965 7 Sheets-Sheet 1

Aug. 5, 1969 J. F. WILSON ET AL 3,459,645

METHOD OF ELECTROCHEMICALLY MACHINING A WORKPIECE INCREMENTALLY USING A PLURALITY OF ELECTRODES DIMENSIONAL PROGRESSIVELY CLOSER TO THE DESIRED CONFIGURATION

Filed Dec. 17, 1965 7 Sheets-Sheet 2

Aug. 5, 1969 J. F. WILSON ET AL 3,459,645

METHOD OF ELECTROCHEMICALLY MACHINING A WORKPIECE INCREMENTALLY USING A PLURALITY OF ELECTRODES DIMENSIONAL PROGRESSIVELY CLOSER TO THE DESIRED CONFIGURATION

Filed Dec. 17, 1965 7 Sheets-Sheet 4

Aug. 5, 1969 J. F. WILSON ET AL 3,459,645

METHOD OF ELECTROCHEMICALLY MACHINING A WORKPIECE INCREMENTALLY USING A PLURALITY OF ELECTRODES DIMENSIONAL PROGRESSIVELY CLOSER TO THE DESIRED CONFIGURATION

Filed Dec. 17, 1965 7 Sheets-Sheet 6

Aug. 5, 1969 J. F. WILSON ET AL 3,459,645

METHOD OF ELECTROCHEMICALLY MACHINING A WORKPIECE
INCREMENTALLY USING A PLURALITY OF ELECTRODES
DIMENSIONAL PROGRESSIVELY CLOSER
TO THE DESIRED CONFIGURATION

Filed Dec. 17, 1965 7 Sheets-Sheet 7

1

3,459,645
METHOD OF ELECTROCHEMICALLY MACHINING A WORKPIECE INCREMENTALLY USING A PLURALITY OF ELECTRODES DIMENSIONAL PROGRESSIVELY CLOSER TO THE DESIRED CONFIGURATION

John Francis Wilson, John Goddard, and Derek Aubrey Glew, Bristol, England, assignors to Rolls-Royce Limited, Derby, England, a British company Filed Dec. 17, 1965, Ser. No. 514,597
Claims priority, application Great Britain, Dec. 22, 1964, 52,381/64
Int. Cl. B23p *1/04, 1/00*
U.S. Cl. 204—143 1 Claim

ABSTRACT OF THE DISCLOSURE

The disclosure of this invention pertains to a method of electrochemical machining of, for example, deep three-dimensional shapes for carrying out the machining. The present method makes possible the machining of the first and opposite second surfaces of the workpiece simultaneously. The workpiece is subjected to a succession of discrete operations in each of which a tool is held in fixed spaced relationship to the workpiece while material is electrochemically removed from the workpiece by passage of an electric current between the tool and the workpiece.

This invention relates to a method of an apparatus for electrochemically machining an electrically conducting work piece to a required shape wherein an electric current is passed between the work piece and a suitably shaped tool through an electrolyte separating them so as to remove material from the work piece.

The usual method of machining includes relatively feeding the tool towards the work piece as the electrolytic action progresses. In that method a difficulty arises if different portions of the tool surface lie markedly at different angles to the direction of feed because the more nearly a surface portion lies parallel to the direction of feed the less will be its feed rate normal to the surface to be machined. Thus portions lying at different angles have different rates of metal removal and this results in disconformity between tool and work. The problem is particularly acute in the machining of deep three-dimensional shapes or where the surface to be machined substantially surrounds the body of the work piece. In such cases it has been the practice to produce different parts of the surface in separate machining operations. This is an awkward process often leading to inaccuracy. Also, separate finishing operations are necessary to remove ridges or like unevenesses which are unavoidably left at the juncture of two surfaces which have been produced in separate operations. The main object of this invention is to overcome these difficulties.

The present invention provides a method of electrochemical machining wherein a work piece is subject to a succession of discrete operations in each of which a tool is held in fixed spaced relationship to the work piece while material is electrochemically removed therefrom by passage of an electric current between the tool and the work piece.

Means for carrying out the aforesaid method may comprise a set of at least two tools intended for successive use and wherein the working surfaces of the respective tools are dimensioned to lie progressively closer to the finished shape of the work piece.

A method of electrochemical machining and examples of apparatus therefor will now be described with reference to the accompanying drawings wherein:

2

Figure 1:
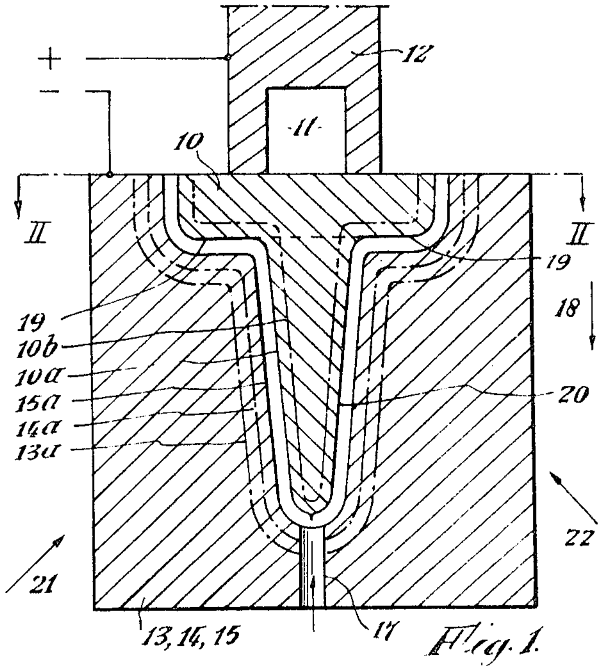
FIG. 1 is a sectional elevation of a work piece and tool in machining relationship.
Figure 2:
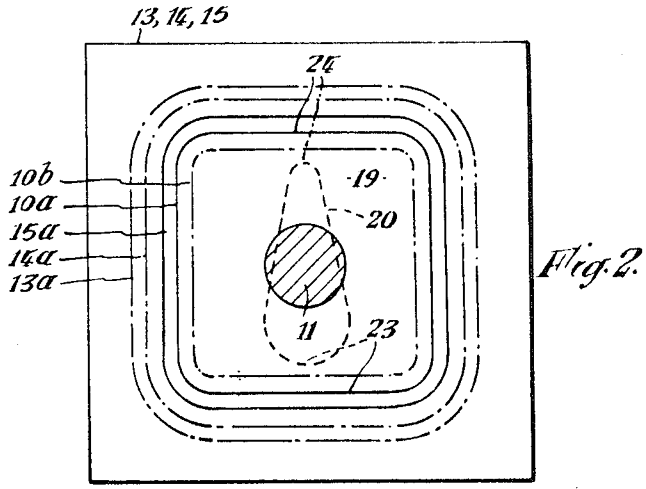
FIG. 2 is a section on the line II—II in FIG. 1.

Referring to FIGS. 1 and 2, there is shown a work piece 10 having a root portion 11 by which it is releasably secured to a work holder 12. The surface to be machined is denoted 10*a*. The work piece is shown in spaced machining relationship to a tool 15 which has a surface 15*a* confronting the surface 10*a* of the work piece across a space or gap 16. The work piece is held stationary relative to the tool. An electrolyte is pumped through the gap 16 from an opening 17 in the tool 15 and when a current is passed between the tool and the work piece material separates from the surface 10*a* with the effect of enlarging the gap 16 and producing a new surface 10*b*. When that has taken place the current is switched off and the operation with that particular tool is completed. The operation described is assumed to be the last of three such operations the first two of which were made with tools 13, 14 similar to the tool 15 but have working surfaces 13*a* and 14*a* respectively. In other words the work piece is machined in three separate operations carried out respectively in the tools 13, 14, 15 whose working surfaces 13*a*, 14*a*, 15*a* lie progressively closer to the finished shape 10*b* of the work piece.

The gap 16 is shown to an enlarged scale and actual dimensions are, for example, .005 inch before machining and .015 inch after machining, i.e. each of the tools 13, 14, 15 removes a layer of .010 inch. However, any size of gap possible in electrochemical machining can be employed and it will be known that, generally, the smaller the gap the higher the rate of machining and the better the accuracy and surface finish of the work piece.

Since the tool and the work piece are stationary there is a natural opportunity for the current density to become uniform over the whole of the surface being machined. In this connection, if at the beginning of the operation with any one of the tools the gap 16 is narrower in some portions of the tool surface than in others, there will be, at such narrower portions, a lesser resistance to current flow and hence a higher rate of machining. Thus current density and machining rate gradually becomes uniform over the whole of the surface being machined. This means that the work piece becomes uniformly accurate. Uniform accuracy is usually defined as meaning that the width of the gap 16 is uniform but one must bear in mind that where the work piece has a sharp corner the shape of the tool is usually adjusted to avoid local increase or diminution in current density (depending on whether the corner is male or female) and at such a corner the gap is then larger or smaller, as the case may be, than elsewhere on the work piece.

It will be seen that the shape of the work piece is a deep three-dimensional shape and that, as seen in FIG. 2, the surface to be machined completely surrounds the work piece. If such a shape is to be produced by the conventional method of feeding the work piece relative to the tool, then the shape of the work piece 10 would at first suggest that it should be fed into the tool in the direction of an arrow 18. But this is not desirable because it is clear from FIG. 1 that whereas portions 19 of the work surface lie at right angles to the proposed feed direction, other portions, denoted 20, lie virtually parallel to the proposed feed direction. As a result, whereas the rate of machining at the portions 19 is determined by the rate of feed in the direction of the arrow 18, the rate of machining at the portions 20 is determined rather by the time for which the portions 20 face the confronting portions of the tool. The differences in the rate of machining are such that the work piece would become too small at the portions 20. The difficulty is sometimes overcome by making compensating changes in the shape of the tool, but this is not very successful where the differences in the surface angle between the various portions are very marked or where good surface finish and high dimensional accuracy of the work piece are required. An alternative known way of overcoming the difficulty is to provide different tools which are fed to the work piece in different directions. Thus there may be one tool which is fed in the direction of an arrow 21 and another tool which is fed in the direction of an arrow 22. Such a procedure has the disadvantage that it would still not be possible to provide a good finish of the work piece at the localities 23, 24 (FIG. 2) because these localities lie parallel to the horizontal component of the feed direction. Other difficulties connected with the separate machining of separate portions of the work surface are discussed later in this specification.

None of these difficulties occur when using the method according to the present invention which therefore enables a very high degree of accuracy to be obtained in work pieces whose shape has not made this possible hitherto.

FIGS. 3 to 9 show a machine for the batch production of work pieces by means of the invention. The machine has a frame 30 having an annular arrangement of stations 31 each adapted for the support of a tool 32. The stations 31 are surmounted by a head 33 having a series of work holders 34 each adapted to support a work piece 35. The head 33 is adapted to be indexed by means of a motor 36 acting through bevel gearing 37, 38. A plunger 39, operated by a hydraulic ram 40, engages slots 41 in the head 33 to locate the head angularly in positions wherein the work pieces 35 are in registration with the tools 32. A hydraulic ram 42 is operable to move the head 33 to insert the work pieces into the tools 32 or withdraw them therefrom. During indexing, the plunger 39 engages the nearest slot 40 approaching it thereby stopping the rotation of the head 33. The motor 36 is switched off at about the time when the plunger engages the slot and a clutch 44 in the motor drive is adapted to slip during any overlap between the stopping of the head by the plunger and the de-energisation of the motor. When the head is lowered the gear 38 disengages from the gear 37, engagement being resumed when the head is raised again. Also, when the head is lowered the relevant slot 40 slides off the plunger 39 and onto a key 43 secured to the frame 30 whereby the head is retained in its intended angular position during the whole of its vertical movement.

It will be understood that each work piece is machined at each tool in turn and that successive tools are dimensioned to lie progressively closer to the finished shape of the work pieces.

Figure 5:
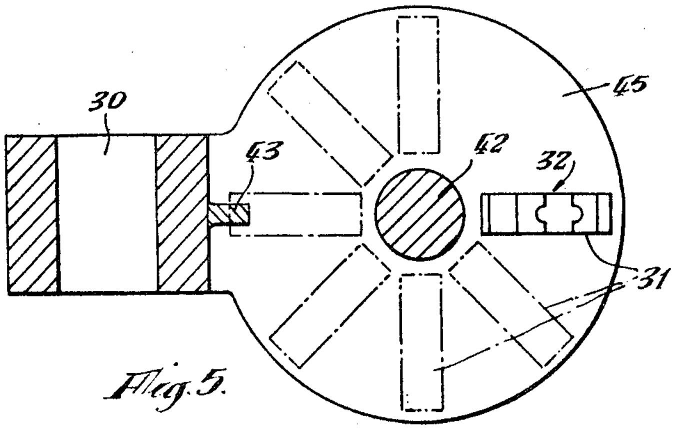
FIG. 5 is a section on the line V—V in FIG. 1.

As shown in FIG. 5 there is provided between the first and the last tool station 31 a loading station 45 where an operator removes the finished work pieces from the holders 34 and attaches blank work pieces thereto.

Figure 3:
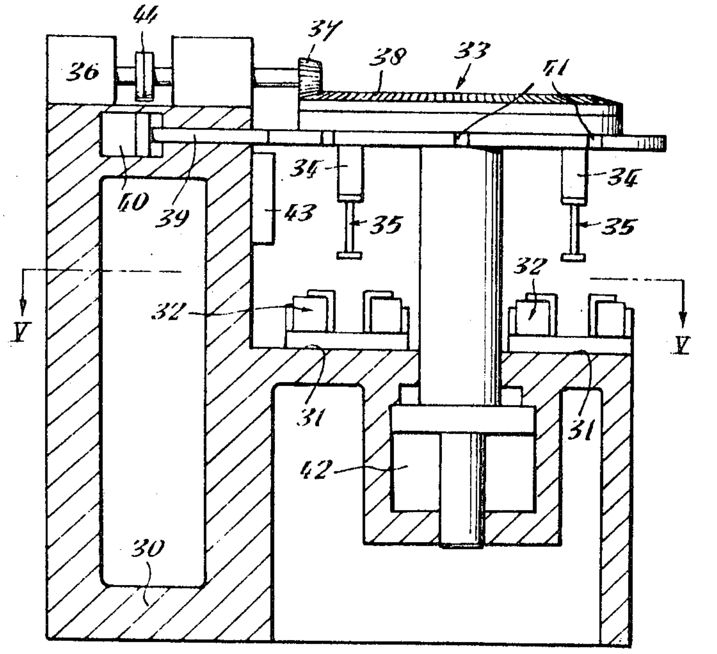
FIG. 3 is a sectional elevation of a machine embodying a plurality of different tools.
Figure 4:
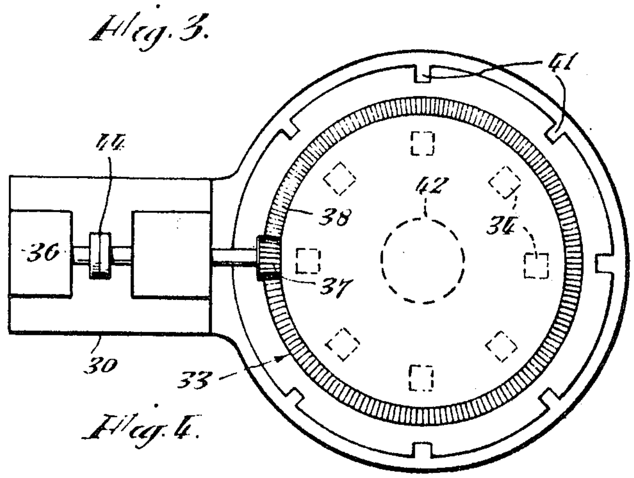
FIG. 4 is a plan view of FIG. 3.
Figure 8:
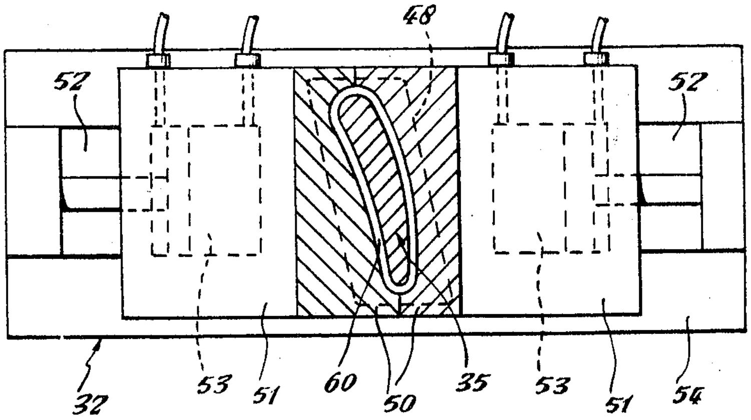
FIG. 8 is a section on the line VIII—VIII in FIG. 7.
Figure 6:
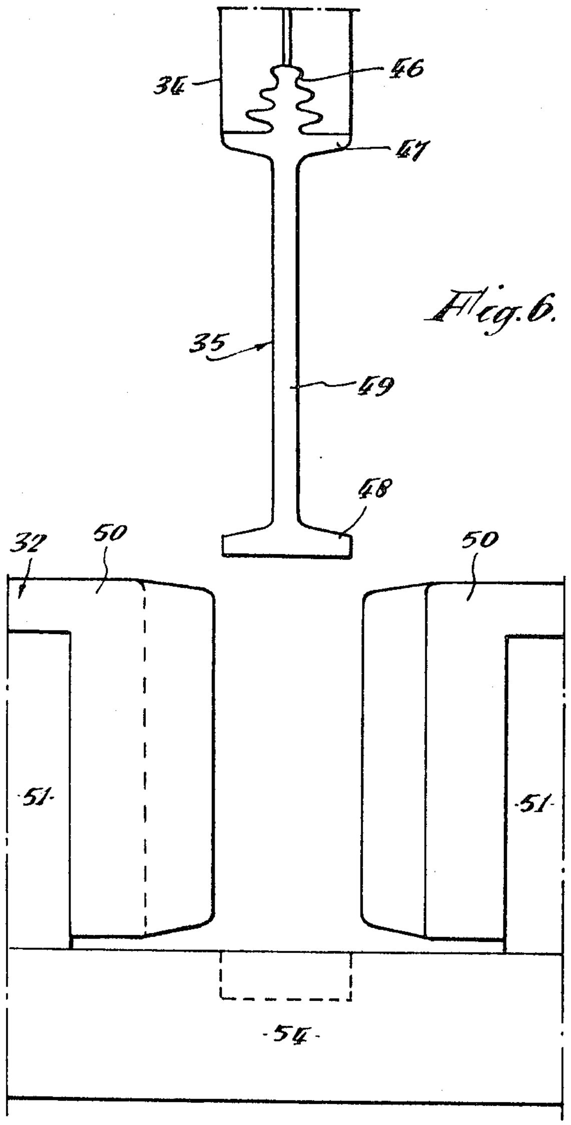
FIG. 6 is an enlarged detail of FIG. 1.
Figure 7:
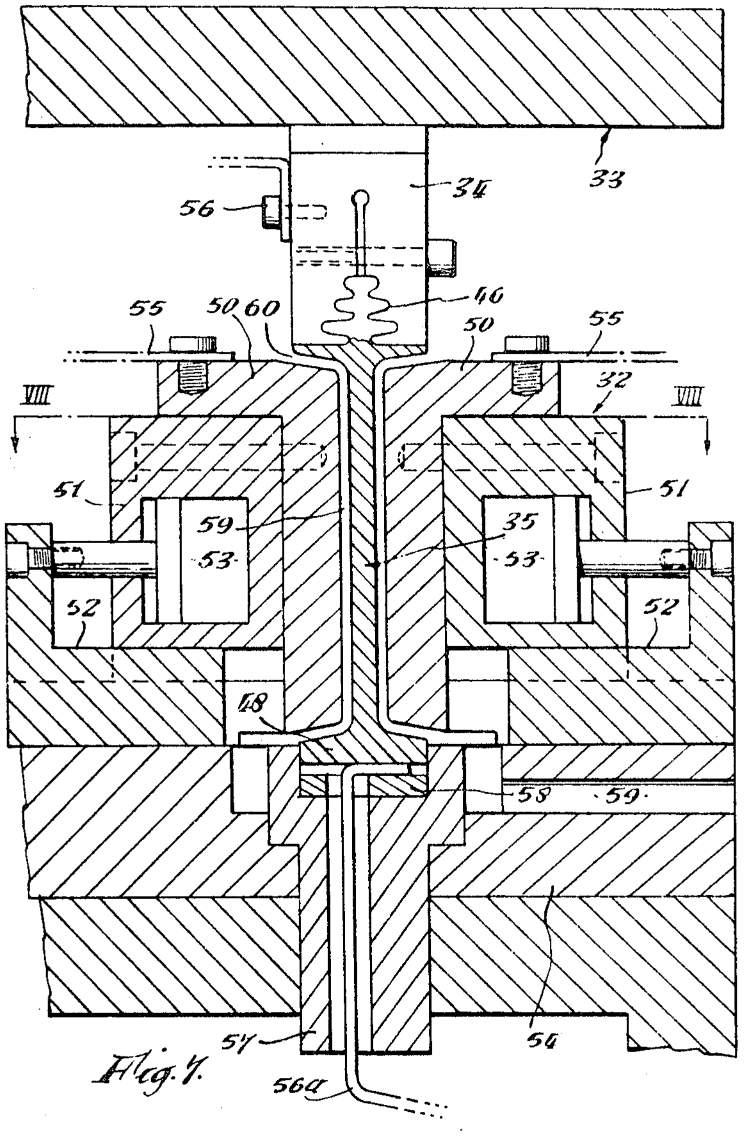
FIG. 7 shows the detail of FIG. 6 in section and in a different operational position.

The work piece 35 shown in this example is a turbine blade having a firtree root portion 46 by which it is attached to the holder 34 (FIGS. 6, 7) and having shrouds 47, 48 at the respective ends of a working or aerofoil portion 49. As shown in FIGS. 7, 8 the tools are adapted for the simultaneous machining of the whole of the aerofoil portion 49 (FIG. 6) and the adjacent surfaces of the shrouds 47, 48 which surfaces lie substantially opposite each other and substantially at right angles to the surface of the portion 49. Each tool 32 comprises two electrodes 50 dimensioned, when placed together in the working relationship (FIGS. 7, 8), completely to embrace the surface to be machined. Each electrode 50 is secured to a slide 51 supported by a guide 52. Each slide 51 includes a hydraulic ram 53 so that the two slides 51 can be moved to bring the electrodes together into the machining position or to draw them apart to allow insertion or removal of the work piece (FIGS. 3, 6). The guides are provided on a base plate 54 secured to the frame 30.

The electrodes 50 are provided with conductors 35 for connection to the negative side of a current supply whose positive side is connected to the holders 34 at 56. If the work piece is relatively long a current supply is also taken to the bottom end thereof by means of a braided conductor 56*a* led through a socket 57 made of insulating material to the underside of the shroud 48. The socket is also adapted to locate the shroud 48 against lateral displacement, and a resilient pad 58 is provided for the conductor 56 to be pressed against the work piece in a satisfactory manner. Electrolyte is supplied through a duct 59 to flow through the working gap, denoted 60, between the electrodes and the work.

Figure 9:
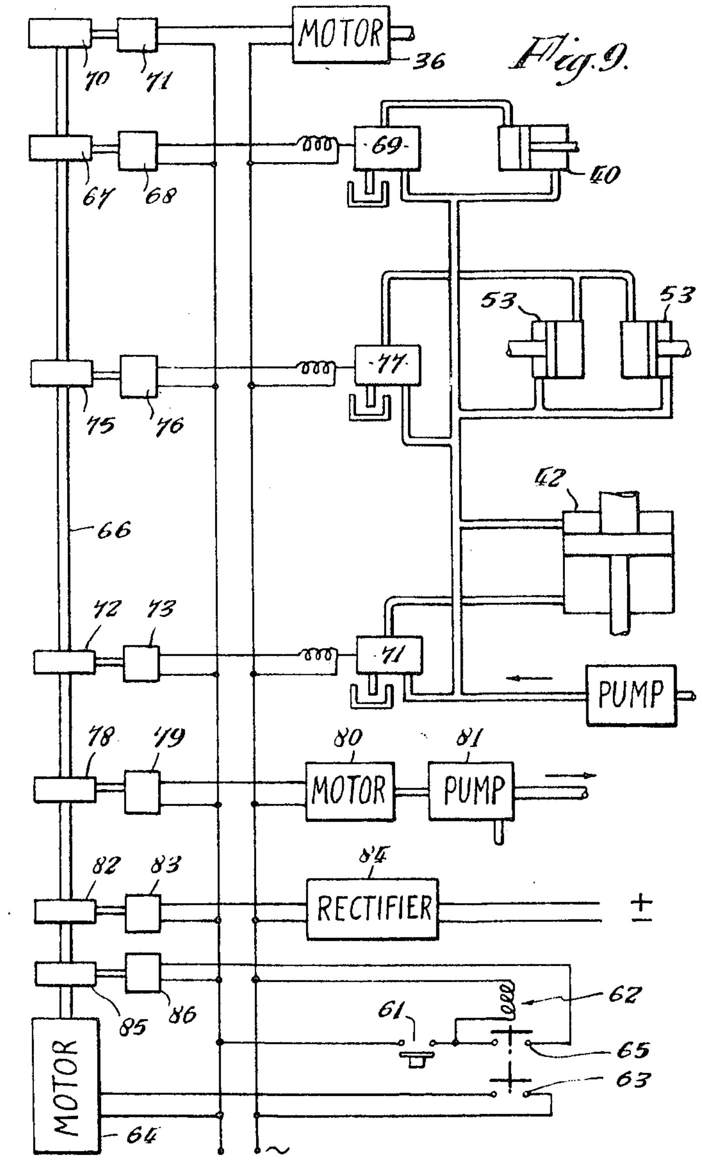
FIG. 9 is a circuit diagram for the machine shown in FIGS. 3 to 8.

FIG. 9 sets forth the necessary control circuit for the machine. This circuit operates automatically for one cycle at a time wherein a cycle comprises the activities between the delivery of two successive finished work pieces at the loading station 45. The cycle is started by the operator pressing a push-button switch 61 to energize a relay 62 having contacts 63 to start a motor 64 and contacts 65 to hold the relay after the switch 61 is released. The motor is adapted to drive a shaft 66 through one revolution per cycle. The various cycle activities are controlled by cams secured to the shaft 66. Immediately after commencement of rotation of the shaft 16 a cam 67 operates a switch 68 to cause a solenoid-operated valve 69 to activate the ram 40 to withdraw the plunger 39 from the head 33. Next a cam 70 operates a switch 71 to energise the motor 36 to rotate the head 33 by one station whereafter the cam 67 returns the plunger 39 and the cam 70 stops the motor 36. Next a cam 72 operates a switch 73 to cause a solenoid-operated valve 74 to activate the ram 42 to lower the head 33 to insert the work pieces 35 into the tools 32. Next a cam 75 operates a switch 76 to cause a solenoid-operated valve 77 to activate the rams 53 of each of the tools 32 to bring the electrodes 50 into the machining position. Next a cam 78 operates a switch 79 to start a motor 80 which drives a pump 81 for supplying electrolyte to the holes 58 at each of the stations 31. Directly thereafter a cam 82 operates a switch 83 for a rectifier 84 to supply the necessary direct current to the electrodes 50 of the respective tools and to the work pieces 35. After a predetermined period the cams 78, 82 stop the electrolyte and the current, the cam 75 withdraws the electrodes 50, and the cam 72 raises the head 33. Lastly a cam 85 operates a switch 86 to break the supply to the holding contacts 65 to stop the motor 64 and the cycle is completed.

It will be seen that although each work piece stays in the machine for several cycles, a finished work piece is produced at the completion of each cycle. Hence the production time can be decreased by increasing the number of tools and let each tool remove only a relatively small amount of the material of the work piece. This accords with the need to keep the gap 60 small, i.e. to use a new tool after the gap has grown by only a small amount, so that the rate and the accuracy of the machining process are kept at a maximum.

If, on account of the smallness of the gap 60, it is found difficult to establish a good flow of electrolyte, it is possible to dimension the cam 75 to activate the rams 53 to withdraw the electrodes at least once during machining to allow the gap 60 to be flushed with electrolyte.

A set of tools according to the invention can be used in a machine similar to that described but not having provision for indexing and having only one tool station. The operator would machine all the work pieces first in one tool, then change the tool for the second machining operation and so on. This method means of course that, whereas in a machine having a plurality of tool stations each work piece is handled only once, in a machine having only one tool station each work piece has to be handled as many times as there are tools. It is clear that the worthwhileness of using a multi-station machine increases if the size of the batches to be machined and the number of tools to be used in the process are increased.

Figure 10:
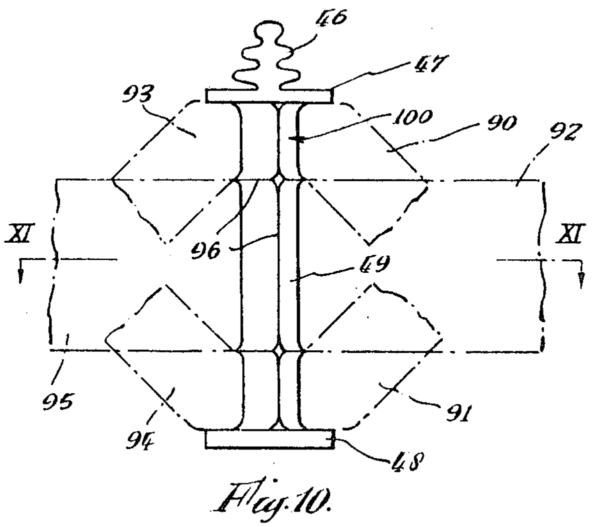
FIG. 10 is an elevation of a work piece and tools and illustrates a known method of machining.
Figure 11:
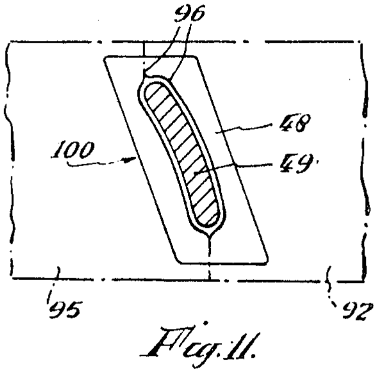
FIG. 11 is a section on the line XI—XI in FIG. 10.

FIGS. 10, 11 show the arrangement of tools necessary if the turbine blades, i.e. the work pieces 35, are machined in conventional manner. As shown in FIG. 10 there is required a tool 90 to machine the corner portion between the shroud 47 and the aerofoil portion 49. A further tool 91 is required to machine the corner portion at the shroud 48 and if the blade is relatively long a third tool 92 is required to machine the central part of the aerofoil portion 49. Since the blade is not symmetrical the tools 90, 91, 92 can be used on one side only and a further three tools 93, 94, 95 are required at the other side. During machining the work piece 35 has to be held in a jig which must include a guide for supporting a tool in the correct feed direction to the work and, generally, a different such jig has to be provided in respect of each of the tools. All this makes for a costly and complicated process without producing good work because it not possible to avoid ridges 96 being left behind at the junction of the surfaces produced by two adjacent tools, and separate finishing operations are necessary to remove those ridges. Also great care must be taken for the adjacent surfaces to be in alignment so that when the ridges 96 are removed the junction should be smooth and continuous. Another difficulty found with the conventional method is that since each tool machines only a part of the blade, there can occur distortion because of local stress relieving of the blank and this is difficult to correct.

What we claim is:

1. Method of electrochemically machining a workpiece whose finish-machined shape includes a first face and substantially opposite second faces extending at an angle thereto, comprising subjecting the workpiece to a succession of machining operations in each of which it is brought into juxtaposition with a tool having a working surface including a first face and substantially opposite second faces extending at an angle thereto wherein a different tool is used for each operation and the tools used in the successive operations are dimensioned to be progressively closer in their resemblance to said finished-machined shape, and wherein successive tools are each held in stationary machining relationship with the workpiece while an electrochemical machining action is caused to take place to remove a layer of material from the workpiece.

References Cited

UNITED STATES PATENTS

| | | | |
|---|---|---|---|
| 1,376,365 | 4/1921 | Wertheimer | 204—143 |
| 2,778,925 | 1/1957 | Gross et al. | 219—69 |
| 3,324,021 | 6/1967 | Haggerty | 204—143 |
| 3,039,950 | 6/1962 | Oelgoetz | 204—242 |
| 3,357,912 | 12/1967 | Inoue | 204—224 |
| 3,288,699 | 11/1966 | Trager et al. | 204—143 |
| 3,363,083 | 1/1968 | O'Conner | 219—69 |
| 3,372,099 | 3/1968 | Clifford | 204—143 |

FOREIGN PATENTS

| | | |
|---|---|---|
| 1,339,370 | 8/1963 | France. |

ROBERT K. MIHALEK, Primary Examiner

U.S. Cl. X.R.

204—224, 286, 297